(12) United States Patent
Gopalan et al.

(10) Patent No.: US 10,895,335 B2
(45) Date of Patent: *Jan. 19, 2021

(54) HOSE, ABRASION RESISTANT COMPOSITION, AND PROCESS OF MAKING A HOSE

(71) Applicant: Cooper-Standard Automotive, Inc., Novi, MI (US)

(72) Inventors: Krishnamachari Gopalan, Troy, MI (US); Robert J. Lenhart, Fort Wayne, IN (US); Gending Ji, Waterloo (CA); Philippe Moureaux, Rennes (FR)

(73) Assignee: COOPER-STANDARD AUTOMOTIVE, INC., Novi, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/521,753

(22) Filed: Jul. 25, 2019

(65) Prior Publication Data

US 2019/0346072 A1  Nov. 14, 2019

Related U.S. Application Data

(63) Continuation of application No. 15/322,816, filed as application No. PCT/US2015/038830 on Jul. 1, 2015, now Pat. No. 10,371,292.

(Continued)

(51) Int. Cl.
*F16L 11/04* (2006.01)
*F16L 11/08* (2006.01)
(Continued)

(52) U.S. Cl.
CPC .............. *F16L 11/04* (2013.01); *B32B 1/08* (2013.01); *B32B 5/02* (2013.01); *B32B 5/022* (2013.01);
(Continued)

(58) Field of Classification Search
CPC ........ F16L 11/04; F16L 11/081; F16L 11/083; B32B 1/08; B32B 5/02; B32B 5/022; B32B 2201/60
(Continued)

(56) References Cited

U.S. PATENT DOCUMENTS 2,788,804 A  4/1957 Larkin
3,644,315 A  2/1972 Gardner et al.
(Continued)

FOREIGN PATENT DOCUMENTS

EP  913427 A1  6/1999
EP  0913427 A1 ‡ 6/1999 .......... C08L 23/0815
(Continued)

OTHER PUBLICATIONS

European Patent Office, International Search Report and Written Opion of the International Searching Authority, PCT Application No. PCT/US2017/065404, dated Mar. 16, 2018 (10 pages).‡

(Continued)

*Primary Examiner* — Patrick F Brinson
(74) *Attorney, Agent, or Firm* — Mary Jo Boldingh

(57) ABSTRACT

A hose made from a composition including one or more of EPR, EPDM, a silane-grafted polyolefin and a silicone-modified polyolefin; and one or more of fibers, polyamide powder, and ultra high molecular weight polyethylene powder. A hose comprising an outermost layer formed from a composition comprising: (A) at least one of EPR, EPDM, a silane-grafted polyolefin and a silicone-modified polyolefin; and (B) at least one of an ultra high molecular weight polyethylene powder, a polyamide powder, and fibers.

16 Claims, 2 Drawing Sheets

Related U.S. Application Data

(60) Provisional application No. 62/020,160, filed on Jul. 2, 2014.

(51) Int. Cl.
| | |
|---|---|
| *B32B 5/02* | (2006.01) |
| *B32B 25/02* | (2006.01) |
| *B32B 25/04* | (2006.01) |
| *B32B 25/08* | (2006.01) |
| *B32B 25/10* | (2006.01) |
| *B32B 25/14* | (2006.01) |
| *B32B 27/08* | (2006.01) |
| *B32B 27/12* | (2006.01) |
| *B32B 27/18* | (2006.01) |
| *B32B 27/20* | (2006.01) |
| *B32B 27/32* | (2006.01) |
| *B32B 1/08* | (2006.01) |
| *F16L 11/10* | (2006.01) |

(52) U.S. Cl.
CPC .............. *B32B 5/026* (2013.01); *B32B 25/02* (2013.01); *B32B 25/042* (2013.01); *B32B 25/08* (2013.01); *B32B 25/10* (2013.01); *B32B 25/14* (2013.01); *B32B 27/08* (2013.01); *B32B 27/12* (2013.01); *B32B 27/18* (2013.01); *B32B 27/20* (2013.01); *B32B 27/32* (2013.01); *B32B 27/327* (2013.01); *F16L 11/081* (2013.01); *F16L 11/10* (2013.01); *B32B 2262/0261* (2013.01); *B32B 2262/0269* (2013.01); *B32B 2262/0276* (2013.01); *B32B 2262/101* (2013.01); *B32B 2262/106* (2013.01); *B32B 2264/0257* (2013.01); *B32B 2264/0264* (2013.01); *B32B 2270/00* (2013.01); *B32B 2307/306* (2013.01); *B32B 2307/554* (2013.01); *B32B 2597/00* (2013.01); *B32B 2605/00* (2013.01); *B32B 2605/08* (2013.01)

(58) Field of Classification Search
USPC ................ 138/123–127; 428/36.9, 39.91
See application file for complete search history.

(56) References Cited

U.S. PATENT DOCUMENTS

| | | | |
|---|---|---|---|
| 3,682,201 A | 8/1972 | Atwell et al. | |
| 4,076,698 A | 2/1978 | Anderson et al. | |
| 4,247,667 A | 1/1981 | Nojiri et al. | |
| 4,412,042 A | 10/1983 | Matsuura et al. | |
| 4,412,942 A | 11/1983 | Naarmann et al. | |
| 4,419,844 A ‡ | 12/1983 | Kreisfeld ................ B29C 44/22 49/475 |
| 4,446,283 A | 5/1984 | Doi et al. | |
| 4,515,210 A | 5/1985 | Smith et al. | |
| 4,528,155 A | 7/1985 | Elder | |
| 4,591,606 A | 5/1986 | Bergstrom | |
| 4,614,208 A | 9/1986 | Skarelius | |
| 4,618,654 A | 10/1986 | Schmidtchen et al. | |
| 4,627,472 A ‡ | 12/1986 | Goettler ................ F16L 11/08 138/174 |
| 4,798,864 A | 1/1989 | Topcik | |
| 4,803,244 A | 2/1989 | Umpleby | |
| 4,806,594 A | 2/1989 | Gross et al. | |
| 4,818,789 A | 4/1989 | Tomko et al. | |
| 4,870,136 A | 9/1989 | Yagi et al. | |
| 4,894,281 A | 1/1990 | Yagi et al. | |
| 4,927,184 A | 5/1990 | Bourjot et al. | |
| 4,927,871 A | 5/1990 | Ohori et al. | |
| 5,145,628 A | 9/1992 | Karg et al. | |
| 5,252,660 A | 10/1993 | Hazan et al. | |
| 5,266,627 A | 11/1993 | Meverden et al. | |
| 5,272,236 A | 12/1993 | Lai et al. | |
| 5,278,272 A | 1/1994 | Lai et al. | |
| 5,326,824 A | 7/1994 | Asanuma | |
| 5,380,385 A | 1/1995 | Derroire | |
| 5,472,746 A ‡ | 12/1995 | Miyajima .............. B05D 7/222 138/109 |
| 5,532,066 A | 7/1996 | Latiolais et al. | |
| 5,741,858 A ‡ | 4/1998 | Brann ....................... C08F 8/42 525/10 |
| 5,776,570 A ‡ | 7/1998 | Murakami ................. C08J 5/12 138/137 |
| 5,814,254 A | 9/1998 | Bisconti | |
| 5,824,718 A | 10/1998 | Penfold et al. | |
| 5,837,174 A | 11/1998 | Bisconti | |
| 5,868,981 A | 2/1999 | Bisconti | |
| 5,880,192 A | 3/1999 | Brown et al. | |
| 5,883,144 A ‡ | 3/1999 | Bambara ................... C08F 8/00 264/23 |
| 5,911,940 A | 6/1999 | Walton | |
| 5,974,694 A | 11/1999 | Vecchiola | |
| 5,986,002 A | 11/1999 | Hwang et al. | |
| 5,994,474 A | 11/1999 | Wey et al. | |
| 6,005,055 A | 12/1999 | Dammert et al. | |
| 6,048,935 A | 4/2000 | Penfold et al. | |
| 6,068,026 A | 5/2000 | Garois | |
| 6,124,370 A | 9/2000 | Walton | |
| 6,235,848 B1 | 5/2001 | Bickert et al. | |
| 6,316,512 B1 | 11/2001 | Bambara et al. | |
| 6,339,123 B1 | 1/2002 | Raetzsch | |
| 6,361,842 B1 | 3/2002 | Stachowiak | |
| 6,395,791 B1 | 5/2002 | Chaudhary et al. | |
| 6,399,708 B2 | 6/2002 | Valligny et al. | |
| 6,455,637 B1 | 9/2002 | Jackson | |
| 6,465,547 B1 | 10/2002 | Jackson | |
| 6,476,132 B1 | 11/2002 | Abdou-Sabet et al. | |
| 6,629,547 B1 | 10/2003 | Yamaguchi | |
| 6,652,937 B1 ‡ | 11/2003 | Guo ......................... B32B 1/08 428/35 |
| 6,794,453 B2 | 9/2004 | Jackson et al. | |
| 6,828,011 B2 | 12/2004 | Yu et al. | |
| 6,864,315 B1 | 3/2005 | Hakuta et al. | |
| 7,041,744 B2 | 5/2006 | Palml?f et al. | |
| 7,279,529 B2 | 10/2007 | Hogge et al. | |
| 7,281,547 B2 ‡ | 10/2007 | Cleveland ................ B32B 1/08 138/137 |
| 7,524,911 B2 | 4/2009 | Karjala | |
| 7,834,115 B2 | 11/2010 | Johansson et al. | |
| 8,017,710 B2 | 9/2011 | Sultan et al. | |
| 8,205,391 B2 | 6/2012 | Aritake et al. | |
| 8,210,213 B2 ‡ | 7/2012 | Miyamoto ................ B32B 1/08 138/137 |
| 8,288,470 B2 | 10/2012 | Ansems et al. | |
| 8,299,166 B2 | 10/2012 | Carlsson | |
| 8,318,864 B2 | 11/2012 | Harris et al. | |
| 8,387,625 B2 | 3/2013 | Kawata et al. | |
| 8,728,600 B1 | 5/2014 | Hayes | |
| 8,835,548 B2 | 9/2014 | Esseghir et al. | |
| 9,023,939 B2 | 5/2015 | Ansems et al. | |
| 9,115,620 B2 | 8/2015 | Doneva et al. | |
| 9,127,110 B2 | 9/2015 | Sugita et al. | |
| 9,387,625 B2 | 7/2016 | Esseghir et al. | |
| 10,040,888 B1 | 8/2018 | Gopalan | |
| 10,100,139 B2 | 10/2018 | Gopalan | |
| 10,253,127 B2 | 4/2019 | Gopalan | |
| 2001/0001395 A1* | 5/2001 | Shifman ................ F16L 11/081 138/126 |
| 2002/0100516 A1 ‡ | 8/2002 | Powell ....................... D04C 1/02 138/125 |
| 2002/0177659 A1 | 11/2002 | Morikawa | |
| 2004/0006179 A1 | 1/2004 | Graf | |
| 2004/0045619 A1 | 3/2004 | Backman et al. | |
| 2004/0103948 A1 | 6/2004 | Scheelen et al. | |
| 2004/0157053 A1 | 8/2004 | Yu et al. | |
| 2004/0265524 A1 | 12/2004 | Wideman et al. | |
| 2004/0265563 A1 | 12/2004 | Sakai et al. | |
| 2005/0095374 A1 | 5/2005 | Cothran et al. | |
| 2005/0100747 A1 | 5/2005 | Gopalan et al. | |
| 2005/0268979 A1 ‡ | 12/2005 | Hibino ................ B29C 47/0021 138/121 |

(56) References Cited

U.S. PATENT DOCUMENTS

| | | |
|---|---|---|
| 2005/0269737 A1 | 12/2005 | Hogge |
| 2006/0185750 A1 | 8/2006 | Mestemacher |
| 2007/0027250 A1 ‡ | 2/2007 | Joseph .............. C08L 23/0815 524/51 |
| 2007/0122570 A1 | 3/2007 | Honda et al. |
| 2007/0219334 A1 | 9/2007 | Li Pi Shan |
| 2008/0023215 A1 | 1/2008 | Uehara et al. |
| 2008/0053551 A1* | 3/2008 | Hatchett ................ B32B 1/00 138/125 |
| 2008/0097038 A1 | 4/2008 | Biscoglio et al. |
| 2008/0167421 A1 | 7/2008 | Yalvac |
| 2008/0306217 A1 | 12/2008 | Karjala et al. |
| 2008/0314470 A1 | 12/2008 | Trace et al. |
| 2009/0143531 A1 | 6/2009 | Ouhadi et al. |
| 2010/0029827 A1 | 2/2010 | Ansems |
| 2010/0209705 A1 | 8/2010 | Lin et al. |
| 2010/0249256 A1 | 9/2010 | Moscardi et al. |
| 2011/0009514 A1 | 1/2011 | Chaudhary |
| 2011/0021103 A1 | 1/2011 | Alper |
| 2011/0060078 A1 | 3/2011 | Becker |
| 2011/0111155 A1* | 5/2011 | Ek .......................... C08L 23/04 428/36.9 |
| 2011/0144277 A1 | 6/2011 | Weissenbach et al. |
| 2011/0144278 A1 | 6/2011 | Weissenbach et al. |
| 2011/0146792 A1 | 6/2011 | Wu et al. |
| 2011/0172367 A1 | 7/2011 | Backer et al. |
| 2011/0259464 A1 | 10/2011 | Lacroix et al. |
| 2012/0042980 A1 | 2/2012 | Mezzalira et al. |
| 2012/0145275 A1 | 6/2012 | Seebold et al. |
| 2012/0171496 A1 | 7/2012 | Esseghir et al. |
| 2012/0178867 A1 | 7/2012 | Esseghir et al. |
| 2012/0312581 A1 | 12/2012 | Yasuda et al. |
| 2014/0191161 A1 | 7/2014 | Amako et al. |
| 2014/0200297 A1 | 7/2014 | Kimura |
| 2015/0025165 A1 | 1/2015 | Chen |
| 2015/0047264 A1 | 2/2015 | Kobayashi |
| 2016/0174655 A1 ‡ | 6/2016 | Schiller ................. A43B 13/12 36/30 R |
| 2016/0208060 A1 | 7/2016 | Nishiguchi et al. |
| 2016/0251535 A1 | 9/2016 | Chaudhary et al. |
| 2017/0130876 A1 | 5/2017 | Gopalan et al. |
| 2017/0204353 A1 | 7/2017 | Lee |
| 2018/0163901 A1 | 6/2018 | Gopalan |
| 2018/0223025 A1 | 8/2018 | Gopalan et al. |
| 2018/0237569 A1 | 8/2018 | Gopalan et al. |
| 2019/0346072 A1 | 11/2019 | Gopalan |

FOREIGN PATENT DOCUMENTS

| | | | |
|---|---|---|---|
| EP | 920876 A2 ‡ | 6/1999 | |
| EP | 920876 A2 | 6/1999 | |
| EP | 944670 B1 | 4/2003 | |
| EP | 1820821 A1 ‡ | 8/2007 | .......... C08L 23/0815 |
| EP | 1820821 A1 | 8/2007 | |
| EP | 1849816 B1 | 6/2008 | |
| EP | 2083047 A1 | 7/2009 | |
| EP | 1644439 B1 | 8/2009 | |
| EP | 2143984 A1 | 1/2010 | |
| EP | 2407496 A1 | 1/2012 | |
| EP | 2520422 A1 | 11/2012 | |
| EP | 2546291 A1 ‡ | 1/2013 | ............ C08J 9/0042 |
| EP | 2546291 A1 | 1/2013 | |
| EP | 2395878 B1 | 4/2013 | |
| JP | 2013119583 A | 6/2013 | |
| KR | 20090014439 A | 2/2009 | |
| WO | WO9001503 A1 | 2/1990 | |
| WO | WO2004031292 A2 | 4/2004 | |
| WO | WO-2005005532 A1 ‡ | 1/2005 | ............ C08F 255/00 |
| WO | WO2005005532 A1 | 1/2005 | |
| WO | WO-2006041362 A1 * | 4/2006 | ........... C09D 123/06 |
| WO | WO2010074916 A1 | 7/2010 | |
| WO | WO2010098932 A1 | 9/2010 | |
| WO | WO-2013134945 A1 ‡ | 9/2013 | |
| WO | WO2013134945 A1 | 9/2013 | |
| WO | WO-2015054893 A1 ‡ | 4/2015 | |
| WO | WO2015054893 A1 | 4/2015 | |
| WO | WO-2015126931 A1 ‡ | 8/2015 | |
| WO | WO2015126931 A1 | 8/2015 | |
| WO | WO2016004204 A1 | 1/2016 | |

OTHER PUBLICATIONS

European Patent Office, International Search Report and Written Opinion of the International Searching Authority, PCT Application No. PCT/US2017/065459, dated May 25, 2018 (16 pages).‡

State Intellectual Property Office of the P.R.C.; First Office Action in Application No. 201580046407.0;dated Jul. 19, 2018; 7 pages; Beijing, China.‡

European Patent Office, "International Search Report and the Written Opinion of the International Searching Authority," PCT Application No. PCT/US2017/065451, dated Mar. 16, 2018 (10 pages).‡

European Patent Office, "International Search Report and the Written Opinion of the International Searching Authority," PCT Application No. PCT/US2017/065442, dated Mar. 16, 2018 (10 pages).‡

European Patent Office, "International Search Report and the Written Opinion of the International Searching Authority," PCT Application No. PCT/US2017/065463, dated Mar. 16, 2018 (10 pages).‡

European Patent Office, "International Search Report and the Written Opinion of the International Searching Authority," PCT Application No. PCT/US2017/065386, dated Mar. 22, 2018 (11 pages).‡

European Patent Office, "International Search Report and the Written Opinion of the International Searching Authority," PCT Application No. PCT/US2017/065376, dated Feb. 22, 2018 (11 pages).‡

State Intellectual Property Office of the P.R.C., "First Office Action in Application No. 201580046407.0", dated Jul. 19, 2018, p. 7 pp., Published in: Beijing, China.

Adachi et al., "Controllable Sllane Water-Cross-Linking Kinetics and Curability of Ethylene-Propylene Copolymer by Amine Compounds, Industrial and Engineering Chemist", 2008, pp. 1812-1819, vol. 47.

Arhart, Richard J., "The Chemistry of Ethylene Propylene Insulation-PartII", 1993, Page(s) pp. 11-14, vol. 9, No. 6, Publisher: IEEE Electrical Insulation Magazine.

Dow Corning, "Plastics, Polymerization and Rubber", 2009, p. 5 pp.

Gopalan et al., "U.S. Appl. No. 14/305,918, filed Jun. 16, 2014", Jun. 16, 2014.

Gopalan et al., "U.S. Appl. No. 14/449,702, filed Aug. 1, 2014", Aug. 1, 2014.

Dow, "High Performance Foam Solutions for Sports Shoes", 2013, p. 22 pp.

European Patent Office, "International Search Report and the Written Opinion of the International Searching Authority, PCT Application No. PCT/US2017/065442", dated Mar. 16, 2018, p. 10 pp.

European Patent Office, "International Search Report and the Written Opinion of the International Searching Authority, PCT Application No. PCT/US2017/065451", dated Mar. 16, 2018, p. 10 pp.

European Patent Office, "International Search Report and Written Opinion of the International Searching Authority, PCT Application No. PCT/US2017/065459", dated May 25, 2018, p. 16 pp.

European Patent Office, "International Search Report and the Written Opinion of the International Searching Authority, PCT Application No. PCT/US2017/065463", dated Mar. 16, 2018, p. 10 pp.

European Patent Office, "International Search Report and the Written Opinion of the International Searching Authority, PCT Application No. PCT/US2017/065360", dated Mar. 26, 2018, p. 11 pp.

European Patent Office, "International Search Report and the Written Opinion of the International Searching Authority, PCT Application No. PCT/US2017/065376", dated Feb. 22, 2018, p. 11 pp.

European Patent Office, "International Search Report and the Written Opinion of the International Searching Authority, PCT Application No. PCT/US2017/065386", dated Mar. 22, 2018, p. 11 pp.

European Patent Office, "International Search Report and Written Opion of the International Searching Authority, PCT Application No. PCT/US2017/065404", dated Mar. 16, 2018, p. 10 pp.

(56) References Cited

OTHER PUBLICATIONS

International Searching Authority, "International Search Report and Written Opinion for International Application No. PCT/US2015/038830", dated Sep. 23, 2015, p. 12 pp.

Morshedian et al., "Polyethylene Cross-linking by Two-step Silane Method: A Review", 2009, Page(s) pp. 103-128, vol. 18, No. 2, Publisher: Iranian Polymer Journal.

Morshedian et al., "Silane grafting of polyethylene: effect of molecular structure, physical form, blending, and antioxidants", 2009, Page(s) pp. 1-17, No. 24, Publisher: e-Polymers.

The Dow Chemical Company, "Material Data Center Datasheet of INFUSE 9107-TPO-", , Publisher: Web address https://www.materialdatacenter.com/ms/en/tradenames/Infuse/The+Dow+Chemical+Company/INFUSE%E2%84%A2+9807/4c8e141f/5862.

The Dow Chemical Company, "Material Data Center Datasheet of INFUSE 9807-TPO-", , Publisher: Web address https://www.materialdatacenter.com/ms/en/tradenames/Infuse/The+Dow+Chemical+Company/INFUSE%E2%84%A2+9107/af4357d6/5862.

Wei Wang et al., "Preparation of Low-Density Polyethylene Foams with High Rebound Resilience by Blending with Polyethylene-Octylene Elastomer", 2013, Publisher: Polymer Engineering and Science, https://doi.org/10.1002/pen23509.

Sirisinha et al., "The effect of silane carriers on silane grafting of high-desity polyethylene and properties of crosslinked products", 2010, Page(s) pp. 958-965, vol. 29, Publisher: Polymer Testing.

"Why Use Silane Crosslinking Technology", Jun. 8, 2012, Publisher: https://wenku.baidu.com/view/3454a9a7b0717fd5360cdcb4.

\* cited by examiner
‡ imported from a related application

HOSE, ABRASION RESISTANT COMPOSITION, AND PROCESS OF MAKING A HOSE

This application is a continuing application of U.S. application Ser. No. 15/322,816 filed Dec. 29, 2016, which was the U.S. National Stage filing under 35 USC 371 of International Application No. PCT/US 2015/038830 filed Jul. 1, 2015, which in turn claims the benefit of priority of U.S. Provisional Patent Application Ser. No. 62/020,160, filed Jul. 2, 2014.

BACKGROUND

The present disclosure relates to hose compositions, hoses that may be used in vehicles, and methods for forming the hoses.

Composite hoses are typically used in the automotive industry to transfer fluid within, for example, a heating/cooling or transmission system. This tubing generally includes a Nylon braided flexgard or the like to be placed over all or part of the composite tube to protect the surface from damage due to abrasion during service. However, the addition of a Nylon braided flexgard or the like is expensive and time consuming due to the labor involved during the assembly operation.

It would be desirable to develop new compositions for manufacturing hoses which exhibit good abrasion resistance and can be produced at lower monetary and time costs.

BRIEF DESCRIPTION

The present disclosure relates to compositions including one or more of fibers, polyamide powder, and ultra high molecular weight polyethylene powder; and one or more of EPR (ethylene-propylene copolymer rubber), EPDM (ethylene-propylene-diene terpolymer rubber), a silicone-modified polyolefin and a silane-grafted polyolefin. The compositions are useful in the production of hoses, particularly for vehicle hoses.

Disclosed in embodiments is a hose having an outermost layer formed from the composition.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
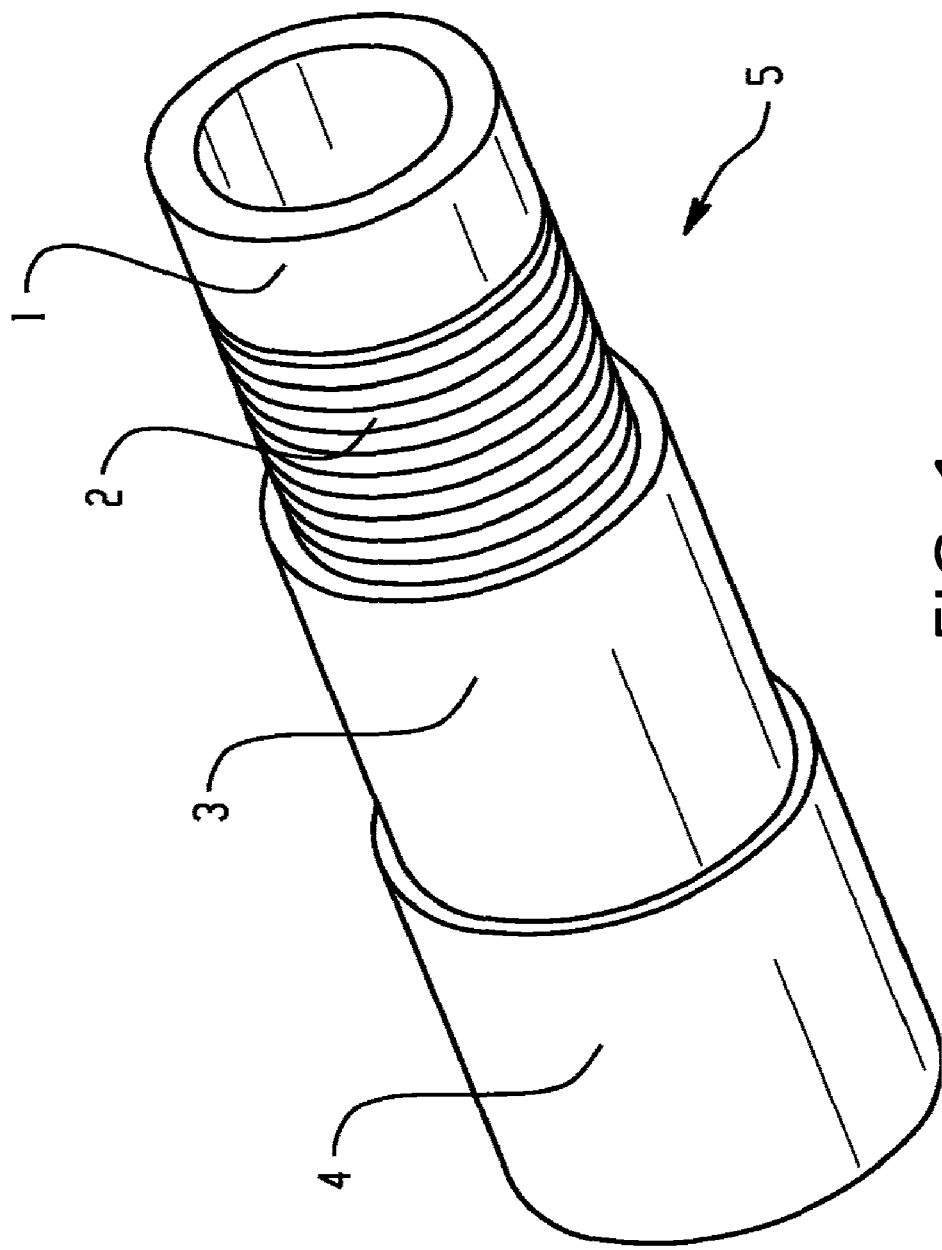
FIG. 1 illustrates an exemplary embodiment of a hose of the present disclosure.
Figure 2:
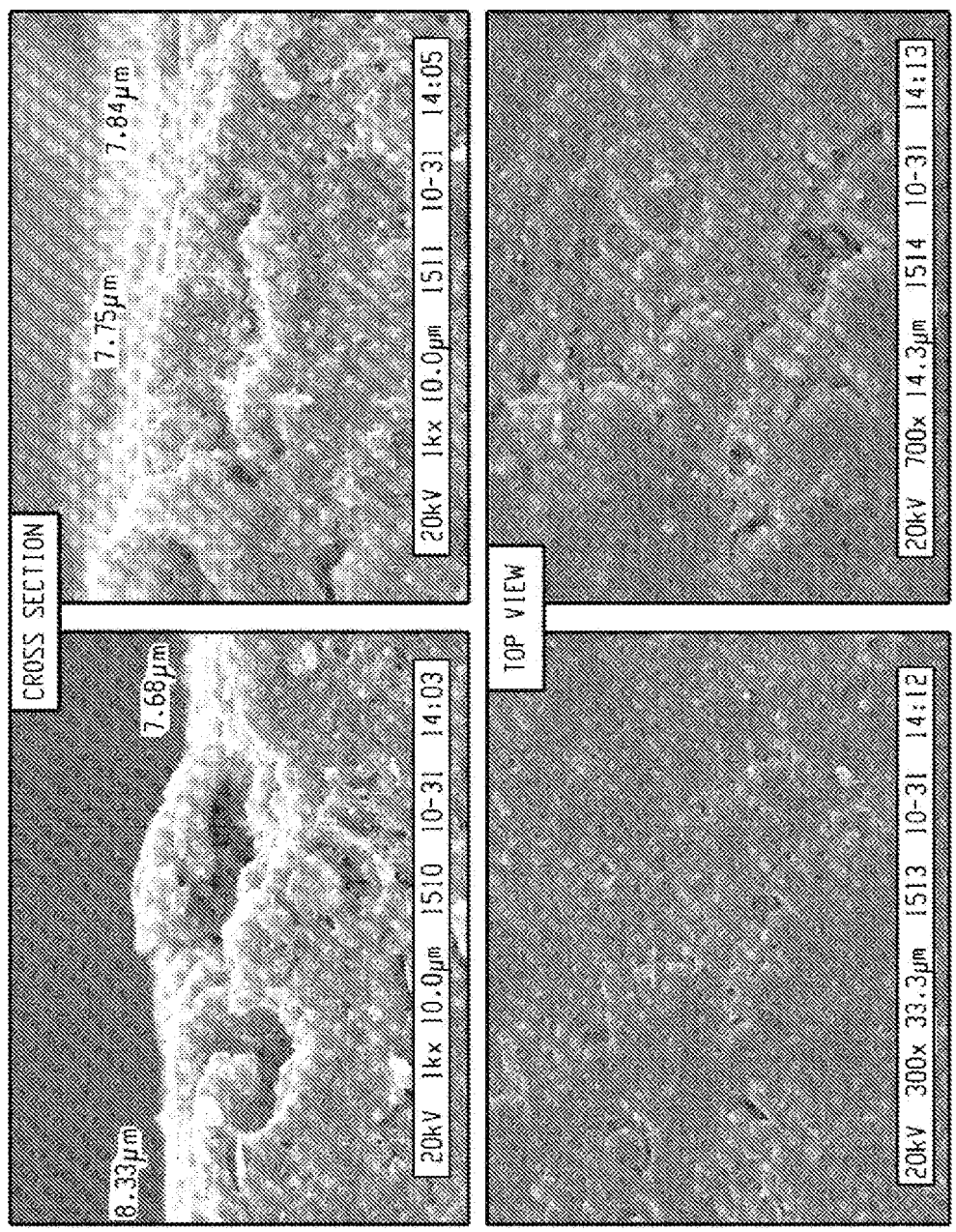
FIG. 2 illustrates cross-sectional and side views of exemplary layers of hoses of the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a" "an," and "the" include plural referents unless the context clearly dictates otherwise.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

A value modified by a term or terms, such as "about" and "substantially," may not be limited to the precise value specified. The approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

The term "ultra high molecular weight polyethylene" refers to a polyethylene having very long chains and a molecular mass in the millions.

The hoses of the present disclosure include a layer including one or more of EPR, EPDM, a silicone-modified polyolefin, and a silane-grafted polyolefin; and one or more of fibers and ultra high molecular weight polyethylene powder for improved abrasion resistance. In some embodiments, the layer includes both a silicone-modified polyolefin and a silane-grafted polyolefin. The layer may be the outermost layer of the hose. In some embodiments, the silicone-modified polyolefin is a silicone-modified ethylene-propylene-diene elastomer.

The ultra high molecular weight polyethylene may have a molecular mass in the range of from about 1 million to about 6 million g/mol. In some embodiments, the ultra high molecular weight polyethylene has a molecular mass in the range of from about 3.1 to about 5.67 million g/mol. In other embodiments, the ultra high molecular weight polyethylene has a molecular weight in the range of from about 1.5 to about 2.5 million g/mol, including about 2 million g/mol. The ultra high molecular weight polyethylene may be produced via any catalyst technology. In some embodiments, a Ziegler catalyst is utilized. The ultra high molecular weight polyethylene may have a density in the range of from about 0.930 to about 0.950 $g/cm^3$, including about 0.94 $g/cm^3$.

One or more types of fibers may be included. Non-limiting examples of fibers Include aramid fibers (e.g., treated short aramid fibers), nylon fibers, glass fibers, carbon fibers, and fibers partially derived from 1,3-propanediol (e.g., DuPont's Sorona fibers).

The hose composition may further include one or more heat-resistant polymers. Non-limiting examples of heat-resistant polymers include ethylene-propylene rubber (EPM) and ethylene propylene diene rubber (EPDM).

FIG. 1 illustrates an exemplary composite hose 5 of the present disclosure. The hose includes a tube 1, a reinforcement layer 2, a cover layer 3, and optionally an overcoat layer 4. The composition containing the fibers, polyamide powder, and/or the ultra high molecular weight polyethylene powder may be included in the cover 3 layer and/or the overcoat layer 4 (when present).

The reinforcement layer 2 may be a yarn for achieving good pressure resistance (e.g., 3 bars at 150° C.). The reinforcement yarn may include knitting, braided fabric, or spiral fabric. The knitting may include lock stitches and/or plain stitches.

The textile of the reinforcement layer 2 may include an aramid such as KEVLAR™ or TWARON™, a polyamide, a polyester, RAYON™, NOMEX™, or TECHNORA™.

In some embodiments the yarn is replaced by short fibers mixed with a silane-grafted polyolefin composition and it will be appreciated that other suitable reinforcement may be used without departing from the scope and intent of the present disclosure.

The tube 1 and/or the cover layer 3 may include a silane-grafted polyolefin. Optionally, the cover layer 3 is formed from the composition containing the ultra high molecular weight polyethylene powder, polyamide powder, and/or the fibers. The cover Dyer 3 may also include a silicone-modified polyolefin, EPR, and/or EPDM.

The cover layer 3 may have a thickness of from about 0.5 mm to about 6.0 mm, including from about 1.5 mm to about 4.5 mm and from about 2 mm to about 3 mm.

The overcoat layer 4 may be formed from a composition including one or more of EPR, EPDM, a silane-grafted polyolefin, and a silicone-modified polyolefin; and one or more of the ultra high molecular weight polyethylene powder, polyamide powder, and/or the fibers.

The overcoat layer 4 may be applied (fir example, injection molded or extruded) onto the entirety of the cover layer 3 or at selected locations thereof where improved abrasion resistance is desired. The overcoat layer 4 may be applied to cover at least or at most 5% of the surface area of the cover layer 3, including at least or at most 10%, at least or at most 15%, at least or at most 20%, at least or at most 25%, at least or at most 30%, at least or at most 35%, at least or at most 40%, at least or at most 45%, at least or at most 50%, at least or at most 55%, at least or at most 60%, at least or at most 70%, at least or at most 75%, at least or at most 80%, at least or at most 85%, at least or at most 90%, and at least or at most 95%.

The overcoat layer 4 may have a thickness of from about 0.2 mm to about 2.0 mm, including from about 0.6 mm to about 1.6 mm and from about 1.0 mm to about 1.2 mm.

The composition of the cover layer 3 and/or overcoat layer 4 may contain (A) from about 5 to about 95 phr of EPR, EPDM, silicone-modified polyolefin, and/or silane-grafted polyolefin and (B) from about 5 to about 60 phr ultra high molecular weight powder, polyamide powder, and/or fibers. In some embodiments, component (A) is present in an amount of from about 30 to about 70 phr and component B is present in an amount of from about 20 to about 45 phr. In particular embodiments, the composition contains about 50 phr of component (A) and about 30 phr of component (B).

In some embodiments, the hose 5 consists of the tube 1, reinforcement layer 2, cover layer 3, and overcoat layer 4. In other embodiments, the hose 5 consists of the tube 1, reinforcement layer 2, and cover layer 3. In further embodiments, the reinforcement layer 2 may be omitted.

Optionally, layers 3 and/or 4 are steam cured.

The polyamide and/or ultra high molecular weight powder may have a particle size in the range of from about 10 μm to about 100 μm, including from about 20 μm to about 80 μm, from about 25 μm to about 65 μm, and about 30 μm. In some embodiments, at least 65 percent of the particles have a particle size in the range of from about 20 μm to about 40 μm.

The silane-grafted polyolefin may be cross-linked upon exposure to moisture and/or heat to form an elastomeric material. The cross-linked polyolefin can be used in place of existing EPDM rubber formulations to manufacture automotive hoses.

Advantageously, the compositions used to form the cover layer 3 and/or the overcoat layer 4 may require a limited number of ingredients (for example, 10, 9, 8, 7, 6, 5, 4, or 3 ingredients). The ingredients may be combined at an extruder during extrusion (e.g., a single-step Monosil process or a two-step Sioplas process), thereby eliminating the need for additional steps of mixing and shipping rubber compounds prior to extrusion.

The specific gravity of the silane-grafted and cross-linked polyolefins of the present disclosure may be lower than the specific gravities of existing EPDM formulations. The reduced specific gravity of the materials leads to lower weight parts, thereby helping automakers meet increasing demands for improved fuel economy. For example, the specific gravity of a representative material of the present disclosure may be from about 0.86 g/cm$^3$ to about 0.96 g/cm$^3$ (which is substantially less than a comparable, conventional specific gravity of 1.10 to 1.40 g/cm$^3$).

The compositions of the present disclosure also reduce the carbon footprint of extrusion plants used to make the hoses or other articles because large quantities of natural gas and/or electrical ovens may not be required for vulcanization. Instead, more efficient low pressure steam chambers can be utilized to vulcanize the silane-grafted polyolefin with minimal fume evolution.

The composition may be the same or similar to a composition disclosed in commonly owned provisional patent application No. 61/835,157, filed Jun. 14, 2013.

The polyolefin elastomer may be a block copolymer, an ethylene/α-olefin copolymer, a propylene/α-olefin copolymer, EPDM, or a mixture of two or more of any of these materials. Exemplary block copolymers include those sold under the trade name INFUSE™ (e.g., INFUSE™ 9000). Exemplary ethylene/α-olefin copolymers include those sold under the trade names VISTAMAXX™ (e.g., VISTAMAXX 6102), TAFMER™ (e.g., TAFMER DF710), and ENGAGE™ (e.g., ENGAGE 8150). Exemplary propylene/α-olefin copolymers include those sold under the trade names TAFMER™ XM grades. The EPDM may have a diene content of from about 0.5 to about 10 weight percent.

In some embodiments, the polyolefin is selected from the group consisting of: homopolymers of an olefin or a blend of homopolymers, copolymers of two or more olefins or a blend of copolymers, and a blend of homopolymers with copolymers.

The olefin may be selected from ethylene, propylene, 1-butene, 1-propene, 1-hexene, and 1-octene. The polyolefin may be produced by any process and optionally using any catalyst suitable for polymerizing ethylene and α-olefins. A metallocene catalyst may be used to produce low density ethylene/α-olefin polymers.

Suitable polyethylenes include but are not limited to polyethylene obtained by homopolymerization of ethylene or copolymerization of ethylene and a higher 1-olefin comonomer.

Suitable polypropylenes include but are not limited to polypropylene obtained by homopolymerization of propylene or copolymerization of propylene and an olefin comonomer.

The term "co-monomer" refers to olefin comonomers which are suitable for being polymerized with olefin monomers, such as ethylene or propylene monomers. Comonomers may comprise but are not limited to aliphatic $C_2$-$C_20$ α-olefins. Examples of suitable aliphatic $C_2$-$C_{20}$ α-olefins include ethylene, propylene, 1-butene, 4-methyl-1-pentene, 1-hexene, 1-octene, 1-decene, 1-dodecene, 1-tetradecene, 1-hexadecene, 1-octadecene and 1-eicosene. In an embodiment, the comonomer is vinyl acetate. The term "co-polymer" refers to a polymer, which is made by linking two different types of polymers in the same polymer chain. The term "homo-polymer" refers to a polymer which is made by linking olefin monomers, in the absence of co-monomers. The amount of comonomer can, in some embodiments, be from about 0 to about 12 weight percent based on the weight of the polyolefin, including from about 0 to about 9 weight percent and from greater than 0 to about 7 weight percent. In some embodiments, the comonomer content is greater than about 2 mole percent of the final polymer, including greater than about 3 mole percent and greater than about 6 mole percent. A copolymer can be a random or block (heterophasic) copolymer. In some embodiments, the polyolefin is a random copolymer of propylene and ethylene.

The polyethylene for use in the present disclosure can be classified into several types including, but not limited to, LDPE (Low Density Polyethylene), LLDPE (Linear Low Density Polyethylene), and HDPE (High Density Polyethylene). In another classification, the polyethylene can be classified as Ultra High Molecular Weight (UHMW), High Molecular Weight (HMW), Medium Molecular Weight (MMW) and Low Molecular Weight (LMW). The polyethylene may be an ultra low density ethylene elastomer. The ultra low density ethylene elastomer may have a density of 0.85 g/cm$^3$ or greater.

The polyolefin may include a LDPE/silane copolymer or blend.

The polyolefin such as polyethylene can be produced using any catalyst known in the art including, but not limited to, chromium catalysts, Ziegler-Natta catalysts, metallocene catalysts or post-metallocene catalysts.

In some embodiments, the polyolefin has a molecular weight distribution $M_w/M_n$ of less than or equal to about 5, including less than or equal to about 4, from about 1 to about 3.5, and from about 1 to about 3.

The polyolefin may have a melt viscosity in the range of from about 2,000 cP to about 50,000 cP as measured using a Brookfield viscometer at a temperature of about 177° C. In some embodiments, the melt viscosity is from about 4,000 cP to about 40,000 cP, including from about 5,000 cP to about 30,000 cP and from about 6,000 cP to about 18,000 cP.

The polyolefin may have a melt index (T2), measured at 190° C. under a 2.16 kg load, of from about 20.0 g/10 min to about 3,500 g/10 min, including from about 250 g/10 min to about 1,900 g/10 min and from about 300 g/10 min to about 1,500 g/10 min. In some embodiments, the polyolefin has a fractional melt index of from 0.5 g/10 min to about 3,500 g/10 min.

The polyolefin may be polymerized in two reactors, wherein a first polymer is polymerized in the first reactor and a second polymer is polymerized in the second reactor. The second polymer may be of a higher molecular weight, a different density, and/or be heterogeneous. The reactors may be connected in series or in parallel.

In some embodiments, a blend of two or more polyolefins is silanated and/or cured. The blend may include an ethylene/α-olefin polymer and a propylene/a-olefin polymer.

The polymers and resins of the present disclosure may be treated with one or more stabilizers (e.g., antioxidants). The polymers may be treated before grafting/modification, after grafting/modification, before crosslinking, and/or after crosslinking. Other additives may also be included. Non-limiting examples of additives include antistatic agents, dyes, pigments, UV light absorbers, nucleating agents, fillers, slip agents, plasticizers, fire retardants, lubricants, processing aides, smoke inhibitors, anti-blocking agents, and viscosity control agents. The antioxidant(s) may be present in an amount of less than 0.5 weight percent, including less than 0.2 weight percent of the composition.

In some embodiments, the density of the polyolefin elastomer is less than 1.0 g/cm$^3$, including less than about 0.92 g/cm$^3$. The density may be from about 0.85 g/cm to about 0.96 g/cm$^3$.

The polyolefin elastomer may be present in an amount of from greater than 0 to about 100 weight percent of the composition. In some embodiments, the amount of polyolefin elastomer is from about 30 to about 70 weight percent.

The percent crystallinity of the polyolefin elastomer may be less than about 40%, less than about 35%, less than about 30%, less than about 25%, or less than about 20%. In some embodiments, the crystallinity is in the range of from about 2% to about 60%.

The silane grafted to the polyolefin may be selected from alkoxysilanes, silazanes and siloxanes.

Non-limiting examples of silazanes include hexamethyldisilazane (HMDS or Bis(trimethylsilyl)amine). Non-limiting examples of siloxane compounds include polydimethylsiloxane (PDMS) and octamethylcyclotetrasiloxane.

In some embodiments, the silane is an alkoxysilane. As used herein, the term "alkoxysilane" refers to a compound that comprises a silicon atom, at least one alkoxy group and at least one other organic group, wherein the silicon atom is bonded with the organic group by a covalent bond. Preferably, the alkoxysilane is selected from alkylsilanes; acryl-based silanes; vinyl-based silanes; aromatic silanes; epoxy-based silanes; amino-based silanes and amines that possess —NH$_2$, —NHCH$_3$ or —N(H$_3$)$_2$; ureide-based silanes, mercapto-based silanes; and alkoxysilanes which have a hydroxyl group (i.e., —OH). An acryl-based silane may be selected from the group comprising beta-acryloxyethyl trimethoxysilane; beta-acryloxy propyl trimethoxysilane; gamma-acryloxyethyl trimethoxysilane; gamma-acryloxypropyl trimethoxysilane; beta-acryloxyethyl triethoxysilane; beta-acryloxypropyl triethoxysilane; gamma-acryloxyethyl triethoxysilane; gamma-acryloxypropyl triethoxysilane; beta-methacryloxyethyl trimethoxysilane; beta-methacryloxypropyl trimethoxysilane; gamma-methacryloxyethyl trimethoxysilane; gamma-methacryloxypropyl trimethoxysilane; beta-methacryloxyethyl triethoxysilane; beta-methacryloxypropyl triethoxysilane; gamma-methacryloxyethyl triethoxysilane; gamma-methacryloxypropyl triethoxysilane; 3-methacryloxypropylmethyl diethoxysilane. A vinyl-based silane may be selected from the group comprising vinyl trimethoxysilane; vinyl triethoxysilane; p-styryl trimethoxysilane, methylvinyldimethoxysilane, vinyldimethylmethoxysilane, divinyldimethoxysilane, vinyltris(2-methoxyethoxy)silane, and vinylbenzylethylenediaminopropyltrimethoxysilane. An aromatic silane may be selected from phenyltrimethoxysilane and phenyltriethoxysilane. An epoxy-based silane may be selected from the group comprising 3-glycydoxypropyl trimethoxysilane; 3-glycydoxypropylmethyl diethoxysilane; 3-glycydoxypropyl triethoxysilane; 2-(3,4-epoxycyclohexyl)ethyl trimethoxysilane, and glycidyloxypropylmethyldimethoxysilane. An amino-based silane may be selected from the group comprising 3-aminopropyl triethoxysilane; 3-aminopropyl trimethoxysilane; 3-aminopropyldimethyl ethoxysilane; 3-aminopropylmethyldiethoxysilane; 4-aminobutyltriethoxysilane; 3-aminopropyldiisopropyl ethoxysilane; 1-amino-2-(dimethylethoxysilyl)propane; (aminoethylamino)-3-isobutyldimethyl methoxysilane; N-(2-aminoethyl)-3-aminoisobutylmethyl dimethoxysilane; (aminoethylaminomethyl)phenetyl trimethoxysilane, N-(2-aminoethyl)-3-aminopropylmethyl dimethoxysilane; N-(2-aminoethyl)-3-aminopropyl trimethoxysilane; N-(2-aminoethyl)-3-aminopropyl triethoxysilane; N-(6-aminohexyl)aminomethyl trimethoxysilane, N-(6-aminohexyl)aminomethyl trimethoxysilane, N-(6-aminohexyl)aminopropyl trimethoxysilane; N-(2-aminoethyl)-1,1-aminoundecyl trimethoxysilane; 1,1-aminoundecyl triethoxysilane; 3-(m-aminophenoxy)propyl trimethoxysilane; m-aminophenyl trimethoxysilane; p-aminophenyl trimethoxysilane; (3-trimethoxysilylpropyl)diethylenetriamine, N-methylaminopropylmethyl dimethoxysilane; N-methylaminopropyl trimethoxysilane; dimethylaminomethyl ethoxysilane; (N,N-dimethylaminopropyl)trimethoxysilane; (N-acetylglycysil)-3-aminopropyl trimetoxysilane, N-phenyl-3-aminopropyltrimethoxysilane, N-phenyl-3-aminopropyltriethoxysilane, phenylaminopropyltrimethoxysilane, aminoethylaminopropyltrimethoxysilane, and aminoethylaminopropylmethyldimethoxysilane. An ureide-based silane may be 3-ureidepropyl triethoxysilane. A mercapto-based silane may be selected from the group comprising 3-mercaptopropylmethyl dimethoxysilane, 3-mercaptopropyl trimethoxysilane, and 3-mercaptopropyl triethoxysilane. An alkoxysilane having a hydroxyl group may be selected from the group comprising hydroxymethyl triethoxysilane, N-(hydroxyethyl)-N-methylaminopropyl trimethoxysilane; bis(2-hydroxyethyl)-3-aminopropyl triethoxysilane; N-(3-triethoxysilylpropyl)-4-hydroxy butylamide; 1,1-(triethoxysilyl)undecanol; triethoxysilyl undecanol; ethylene glycol acetal; and N-(3-ethoxysilylpropyl)gluconamide.

The alkylsilane may be expressed with a general formula: $R_nSi(OR')_{4-n}$ wherein: n is 1, 2 or 3; R is a $C_{1-20}$ alkyl; and R' is an $C_{1-20}$ alkyl.

The term "alkyl" by itself or as part of another substituent, refers to a straight or branched or cyclic saturated hydrocarbon group joined by single carbon-carbon bonds having 1 to 20 carbon atoms, for example 1 to 10 carbon atoms, for example, 1 to 8 carbon atoms, preferably 1 to 6 carbon atoms. When a subscript is used herein following a carbon atom, the subscript refers to the number of carbon atoms that the named group may contain. Thus, for example, $d_{-6}$ alkyl means an alkyl of one to six carbon atoms. Examples of alkyl groups are methyl, ethyl, propyl, isopropyl, butyl, isobutyl, sec-butyl, f-butyl, 2-methylbutyl, pentyl, iso-amyl and its isomers, hexyl and its isomers, heptyl and its isomers, octyl and its isomer, decyl and its isomer, dodecyl and its isomers.

The term "$C_{2-20}$ alkenyl" by itself or as part of another substituent, refers to an unsaturated hydrocarbyl group, which may be linear, or branched, comprising one or more carbon-carbon double bonds having 2 to 20 carbon atoms. Examples of $C_{2-6}$ alkenyl groups are ethenyl, 2-propenyl, 2-butenyl, 3-butenyl, 2-pentenyl and its isomers, 2-hexenyl and its isomers, 2,4-pentadienyl and the like.

An alkylsilane may be selected from the group comprising methyltrimethoxysilane; methyltriethoxysilane; ethyltrimethoxysilane; ethyltriethoxysilane; propyltrimethoxysilane; propyltriethoxysilane; hexyltrimethoxysilane; hexyltriethoxysilane; octyltrimethoxysilane; octyltriethoxysilane; decyltrimethoxysilane; decyltriethoxysilane; dodecyltrimethoxysilane: dodecyltriethoxysilane; tridecyltrimethoxysilane; dodecyltriethoxysilane; hexadecyltrimethoxysilane; hexadecyltriethoxysilane; octadecyltrimethoxysilane; octadecyltriethoxysilane, trimethylmethoxysilane, methylhydrodimethoxysilane, dimethyldimethoxysilane, dlisopropyldimethoxysilane, diisobutyldimethoxysilane, isobutyltrimethoxysilane, n-butyltrimethoxysilane, n-butylmethyldimethoxysilane, phenyltrimethoxysilane, phenyltrimethoxysilane, phenylmethyldimethoxysilane, triphenylsilanol, n-hexyltrimethoxysilane, n-octyltrimethoxysilane, isooctyltrimethoxysilane, decyltrimethoxysilane, hexadecyltrimethoxysilane, cyclohexylmethyldimethoxysilane, cyclohexylethyldimethoxysilane, dicyclopentyldimethoxysilane, tert-butylethyldimethoxysilane, tert-butylpropyldimethoxysilane, dicyclohexyldimethoxysilane.

The silane compound may be selected from triethoxyoctylsilane, trimethoxyoctylsilane, and a combination thereof.

Examples of silanes include, but are not limited to, those of the general formula $CH_2=CR-(COO)_x(C_nH_{2n})_ySiR'_3$, wherein R is a hydrogen atom or methyl group; x is 0 or 1; y is 0 or 1; n is an integer from 1 to 12; each R' can be an organic group and may be independently selected from an alkoxy group having from 1 to 12 carbon atoms (e.g., methoxy, ethoxy, butoxy), aryloxy group (e.g., phenoxy), araloxy group (e.g., benzyloxy), aliphatic acyloxy group having from 1 to 12 carbon atoms (e.g., formyloxy, acetyloxy, propanoyloxy), amino or substituted amino groups (e.g., alkylamino, arylamino), or a lower alkyl group having 1 to 6 carbon atoms, x and y may both equal 1. In some embodiments, no more than one of the three R' groups is an alkyl. In other embodiments, not more than two of the three R' groups is an alkyl.

Any silane or mixture of silanes that can effectively graft to and crosslink an olefin polymer can be used in the practice of the present disclosure. Suitable silanes include, but are not limited to, unsaturated silanes which include an ethylenically unsaturated hydrocarbyl group (e.g., a vinyl, allyl, isopropenyl, butenyl, cyclohexenyl or a gamma-(meth)acryloxy allyl group) and a hydrolyzable group (e.g., a hydrocarbyloxy, hydrocarbonyloxy, or hydrocarbylamino group). Non-limiting examples of hydrolyzable groups include, but are not limited to, methoxy, ethoxy, formlyoxy, acetoxy, proprionyloxy, and alkyl, or arylamino groups. In some embodiments, the silanes are unsaturated alkoxy silanes which can be grafted onto the polymer. Other exemplary silanes include vinyltrimethoxysilane, vinyltriethoxysilane, 3-(trimethoxysilyl)propyl methacrylate gamma-(meth)acryloxypropyl trimethoxysilane), and mixtures thereof.

The silane may be present in the silane-grafted polyolefin in an amount of from greater than 0 to about 10 weight percent, including from about 0.5 to about 5 weight percent. The amount of silane may be varied based on the nature of the olefin polymer, the silane, the processing conditions, the grafting efficiency, the application, and other factors. The amount of silane may be at least 2 weight percent, including at least 4 weight percent or at least 5 weight percent, based on the weight of the reactive composition. In other embodiments, the amount of silane may be at least 10 weight percent, based on the weight of the reactive composition.

Optionally, the crosslinking is initiated by a catalyst or electron beam radiation. Non-limiting examples of catalysts include organic bases, carboxylic acids, and organometallic compounds (e.g., organic titanates and complexes or carboxylates of lead, cobalt, iron, nickel, zinc, and tin). The catalyst may be selected from fatty acids and metal complex compounds such as metal carboxylates; aluminum triacetyl acetonate, iron triacetyl acetonate, manganese tetraacetyl acetonate, nickel tetraacetyl acetonate, chromium hexaacetyl acetonate, titanium tetraacetyl acetonate and cobalt tetraaretyl acetonate; metal alkoxides such as aluminum ethoxide, aluminum propoxide, aluminum butoxide, titanium ethoxide, titanium propoxide and titanium butoxide; metal salt compounds such as sodium acetate, tin octylate, lead octylate, cobalt octylate, zinc octylate, calcium octylate, lead naphthenate, cobalt naphthenate, dibutyltin dioctoate, dibutyltin dilaurate, dibutyltin maleate and dibutyltin di(2-ethylhexanoate); acidic compounds such as formic acid, acetic acid, propionic acid, p-toluenesulfonic acid, trichloroacetic acid, phosphoric acid, monoalkylphosphoric acid, dialkylphosphoric acid, phosphate ester of p-hydroxyethyl (meth)acrylate, monoalkylphosphorous acid and dialkylphosphorous acid; acids such as p-toluenesulfonic acid, phthalic anhydride, benzoic acid, benzenesulfonic acid, dodecylbenzenesulfonic acid, formic acid, acetic acid, itaconic acid, oxalic acid and maleic acid, ammonium salts, lower amine salts 35 or polyvalent metal salts of these acids, sodium hydroxide, lithium chloride; organometal compounds such as diethyl zinc and tetra(n-butoxy)titanium; and amines such as dicyclohexylamine, triethylamine, N,N-dimethylbenzylarnine, N,N,N',N'-tetramethyl-1,3-butanediamine, diethanolamine, triethanolamine and cyclohexylethylamine. In some embodiments, the catalyst is selected from ibutyltindilaurate, dioctyltinmaleate, dibutyltindiacetate, dibutyltindiortoate, stannous acetate, stannous octoate, lead naphthenate, zinc caprylate, and cobalt naphthenate. A single catalyst or a mixture of catalysts may be utilized. The catalyst(s) may be present in an amount of from about 0.01 weight percent to about 1.0 weight percent in some embodiments.

In some embodiments, the crosslinking system uses a combination of radiation, heat, moisture, and/or crosslinking agents.

Optionally, a grafting initiator is utilized in the grafting process. The grafting initiator may be selected from halogen molecules, azo compounds (e.g., azobisisobutyl), carboxylic peroxyacids, peroxyesters, peroxyketals, and peroxides (e.g., alkyl hydroperoxides, dialkyl peroxides, and diacyl peroxides). In some embodiments, the grafting initiator is an organic peroxide selected from di-t-butyl peroxide, t-butyl cumyl peroxide, dicumyl peroxide, 2,5-dimethyl-2,5-di(t-butyl-peroxy)hexyne-3,1,3-bis(t-butyl-peroxy-isopropyl) benzene, n-butyl-4,4-bis(t-butyl-peroxy)valerate, benzoyl peroxide, t-butylperoxybenzoate, t-butylperoxy isopropyl carbonate, and t-butylperbenzoate, as well as bis(2-methylbenzoyl)peroxide, bis(4-methylbenzoyl)peroxide, t-butyl peroctoate, cumene hydroperoxide, methyl ethyl ketone peroxide, lauryl peroxide, tert-butyl peracetate, di-t-amyl peroxide, t-amyl peroxybenzoate, 1,1-bis(t-butylperoxy)-3, 3,5-trimethyleyelohexane, a,a'-bis(t-butylperoxy)-1,3-diisopropylbenzene, a,a'-bis(t-butylpexoxy)-1,4-diisopropylbenzene, 2,5-bis(t-butylperoxy)-2,5-dimethylhexane, and 2,5-bis(t-butylperoxy)-2,5-dimethyl-3-hexyne and 2,4-dichlorobenzoyl peroxide. Exemplary peroxides include those sold under the tradename LUPEROX™ (e.g., LUPEROXT™ 101).

In some embodiments, the grafting initiator is present in an amount of from greater than 0 to about 2 weight percent of the composition, including from about 0.15 to about 1.2 weight percent of the composition. The amount of initiator and silane employed may affect the final structure of the silane grafted polymer (e.g., the degree of grafting in the grafted polymer and the degree of crosslinking in the cured polymer). In some embodiments, the reactive composition contains at least 100 ppm of initiator or at least 300 ppm of initiator. The initiator may be present in an amount from 300 ppm to 1500 ppm or 2000 ppm. The silane:initiator weight ratio may be from about 20:1 to 400:1, including from about 30:1 to about 400:1 and from about 48:1 to about 350:1 and from about 55:1 to about 333:1.

The grafting reaction can be performed under conditions that optimize grafts onto the interpolymer backbone while minimizing side reactions (e.g., the homopolymerization of the grafting agent). The grafting reaction may be performed in the melt, in solution, in the solid-state, and/or in a swollen-state. The silanation may be performed in a wide-variety of equipment (e.g., twin screw extruders, single screw extruders, Brabenders, internal mixers such as Banbury mixers, and batch reactors). In some embodiments, the polyolefin, silane, and initiator are mixed in the first stage of an extruder. The melt temperature may be from about 120° C. to about 260° C., including from about 130° C. to about 250° C.

The composition optionally includes one or more fillers. The filler(s) may be extruded with the EPR, EPDM, silane-grafted polyolefin, and/or silicone-modified polyolefin. The filler(s) may be selected from metal oxides, metal hydroxides, metal carbonates, metal sulfates, metal silicates, clays, talcs, carbon black, and silicas. These materials may be fumed or calcined.

The metal of the metal oxide, metal hydroxide, metal carbonate, metal sulfate, or metal silicate may be selected from alkali metals (e.g., lithium, sodium, potassium, rubidium, caesium, and francium); alkaline earth metals (e g., beryllium, magnesium, calcium, strontium, barium, and radium); transition metals (e.g. zinc, molybdenum, cadmium, scandium, titanium, vanadium, chromium, manganese, iron, cobalt, nickel, copper, yttrium, zirconium, niobium, technetium, ruthernium, rhodium, palladium, silver, hafnium, taltalum, tungsten, rhenium, osmiun, indium, platinum, gold, mercury, rutherfordium, dubnium, seaborgium, bohrium, hassium, and copernicium); post-transition metals (e.g., aluminum, gallium, indium, tin, thallium, lead, bismuth, and polonium); lanthanides (e.g., lanthanum, Cerium, praseodymium, neodymium, promethium, samarium, europium, gadolinium, terbium, dysprosium, holmium, erbium, thulium, ytterbium, and lutetium); actinides (e.g., actinium, thorium, protactinium, uranium, neptunium, plutonium, americium, curium, berkelium, californium, einsteinium, fermium, mendelevium, nobelium, and lawrencium), germanium; arsenic; antimony; and astatine.

The filler(s) may be present in an amount of from greater than 0 to about 50 weight percent, including from about 1 to about 20 weight percent and from about 3 to about 10 weight percent.

One stage silane crosslinking can involve the extrusion of a direct mixture of the polymer resin with a silane concentrate that includes a catalyst. The extrudate can be subsequently crosslinked in the presence of moisture/heat. In two-stage crosslinking, silane is first grafted to the polymer molecular chains according to known reactions to yield a silane grafted copolymer.

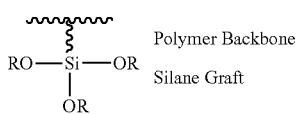

Subsequently, the silane-grafted copolymer is mixed with a silanol forming condensation catalyst and then exposed to humidity and/or heat to effect crosslinking of the copolymer in a two-step reaction. Alternatively the composition can be crosslinked via 'Ambicat' where the ambient moisture is sufficient to crosslink over a longer time period (for example, about 48 hours). First, the water hydrolyzes the silane to produce a silanol. The silanol then condenses to form intermolecular irreversible Si—O—Si crosslink sites.

Step 1

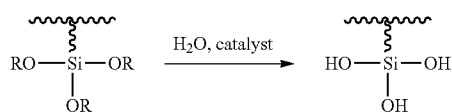

Step 2

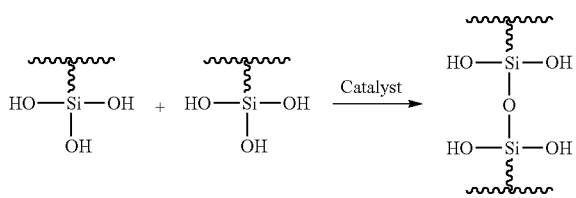

The amount of crosslinked silane groups, and thus the final polymer properties, can be regulated by controlling the production process, including the amount of catalyst used. A gel test (ASTM D2765) can be used to determine the amount of crosslinking.

Curing may occur over a time period of from greater than 0 to about 20 hours. In some embodiments, curing takes place over a time period of from about 1 to about 8 hours, including from about 3 to about 6 hours.

The temperature during curing may be from about 50 to about 150° C., including from about 80 to about 100° C. and from about 85 to about 95° C.

The humidity during curing may be from about 30 to about 100% including from about 40 to about 100% and from about 50 to about 100%.

The number average molecular weight of the grafted polymers may be in the range of from about 4,000 g/mol to about 30,000 g/mol, including from about 5,000 g/mol to about 25,000 g/mol and from about 6,000 g/mol to about 14,000 g/mol. The weight average molecular weight of the grafted polymers may be from about 8,000 g/mol to about 60,000 g/mol, including from about 10,000 g/mol to about 30,000 g/mol.

Optionally, the compositions and/or articles formed therefrom further include one or more TPVs and/or EPDM with or without silane graft moieties. In some embodiments, the compositions and/or articles furthers include other homopolymers, copolymers, and/or terpolymers of ethylene (e.g., LDPE, grafted polymers, maleated polymers, EVA copolymers, ethylene n-butyl acrylate copolymers, and ethylene methacrylate copolymers); homopolymers, copolymers, and/or terpolymers of propylene; rubbery block copolymers (e.g. copolymers having A-B-A configurations, A-B-A-B-A-B configurations, A-B configurations, and radial block copolymers); and other olefin-based polymers. In some embodiments, the additional polymers are present in an amount of up to 50 weight percent of the composition.

The compositions and/or articles may also include waxes (e.g., paraffin waxes, microcrystalline waxes, HDPE waxes, LDPE waxes, thermally degraded waxes, byproduct polyethylene waxes, optionally oxidized Fischer-Tropsch waxes, and functionalized waxes).

Tackifying resins (e.g., aliphatic hydrocarbons, aromatic hydrocarbons, modified hydrocarbons, terpens, modified terpenes, hydrogenated terpenes, rosins, rosin derivatives, hydrogenated rosins, and mixtures thereof) may also be included. The tackifying resins may have a ring and ball softening point in the range of from 70° C. to about 150° C. and a viscosity of less than about 3,000 cP at 177° C.

The compositions may include one or more oils. Non-limiting types of oils include mineral oils (e.g., white mineral oil) and naphthenic oils.

The compositions may be extruded into pellets, pillows, or any other configuration prior to the formation of the final article.

Disclosed in the embodiments is a method for manufacturing a hose comprising a silane-grafted polyolefin.

The silane-grafted composition may be extruded with a thermoplastic extruder at a temperature of from about 140° C. to about 220° C. The extruded article may be cooled by water, reinforced by textile, warmed to a temperature of from about 100° C. to about 150° C., coextruded by the silane-grafted composition, cooled, cut, and formed.

In some embodiments the thickness of a wall of the hose is from about 1 to about 4 mm, preferentially from about 1.5 to about 2.5 mm.

In some embodiments the hoses are formed on mandrel or in external form in hot water or steam.

In some embodiments the hoses are formed by blowing in a mold.

In some embodiments the reticulation of the silane grafted composition is made at room temperature with humidity (in from one to few days for example), in hot water, one to few hours at temperature 20 to 90° C., in steam, 1 to 4 hours at pressure 1 to 5 bars for example.

In some embodiments the hoses are equipped with quick connectors instead of clamps.

The compositions of the present disclosure may be sulfur curable or peroxide curable.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. The above examples are merely illustrative of various aspects of the present disclosure, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising. Moreover, this disclosure is intended to seek protection for a combination of components and/or steps and a combination of claims as originally presented for examination as well as seek potential protection for other combinations of components and/or steps and combinations of claims during prosecution.

What is claimed is:

1. A hose comprising
a tube;
a reinforcement layer circumferentially surrounding the tube; and
a cover layer circumferentially surrounding the reinforcement layer,
wherein the cover layer is formed from a composition comprising:
(A) a silane-grafted polyolefin; and
(B) at least one of an ultra high molecular weight polyethylene powder, a polyamide powder, and fibers.

2. The hose of claim 1 wherein the hose consists of the tube, the reinforcement layer, and the cover layer.

3. The hose of claim 1 further comprising
an overcoat layer formed from a composition comprising:
(C) a silane-grafted polyolefin; and
(D) at least one of an ultra high molecular weight polyethylene powder, a polyamide powder, and fibers;
wherein the overcoat layer circumferentially surrounds the cover layer.

4. The hose of claim 3 wherein the hose consists of the tube, the reinforcement layer, the cover layer, and the overcoat layer.

5. The hose of claim 1 wherein the density of the silane-grafted polyolefin is less than about 0.92 g/cm³.

6. The hose of claim 1 wherein the cover layer comprises at least one of ultra high molecular weight polyethylene powder having an average particle size in the range of from about 10 μm to about 100 μm and a polyamide powder having an average particle size in the range of from about 10 μm to about 100 μm.

7. The hose of claim 1 further comprising a silicone-modified polyolefin.

8. The hose of claim 1 wherein the fibers are selected from aramid fibers and nylon fibers.

9. A hose comprising
a tube;
a reinforcement layer circumferentially surrounding the tube; and
a cover layer circumferentially surrounding the reinforcement layer,
wherein the cover layer is formed from a composition comprising:
(A) at least one of EPR and EPDM,
(B) a silane-grafted polyolefin; and
(C) an ultra high molecular weight polyethylene powder.

10. The hose of claim 9 wherein the hose consists of the tube, the reinforcement layer, and the cover layer.

11. The hose of claim 9 further comprising
an overcoat layer formed from a composition comprising:
(D) at least one of EPR and EPDM,
(E) a silane-grafted polyolefin; and
(F) an ultra high molecular weight polyethylene powder;
wherein the overcoat layer circumferentially surrounds the cover layer.

12. The hose of claim 11 wherein the hose consists of the tube, the reinforcement layer, the cover layer, and the overcoat layer.

13. The hose of claim 9 wherein the density of the silane-grafted polyolefin is less than about 0.92 g/cm³.

14. The hose of claim 9 wherein component (C) has an average particle size in the range of from about 10 μm to about 100 μm.

15. The hose of claim 9 further comprising a silicone-modified polyolefin.

16. An automotive heating and cooling system or an automotive transmission system comprising:
a hose;
wherein the hose comprises
a tube;
a reinforcement layer circumferentially surrounding the tube; and
an outermost layer;
wherein the outermost layer is a cover layer circumferentially surrounding the reinforcement layer; and
wherein the outermost layer is formed from a composition that comprises
(A) a silane-grafted polyolefin and
(B) at least one of treated short aramid fibers, a polyamide powder having an average particle size in the range of from about 10 μm to about 100 μm, and an ultra high molecular weight polyethylene powder having an average particle size in the range of from about 10 μm to about 100 μm;
or wherein the outermost layer is formed from a composition that comprises
(C) at least one of EPR and EDPM,
(D) a silane-grafted ethylene-propylene-diene terpolymer polyolefin and
(E) an ultra high molecular weight polyethylene powder having an average particle size in the range of from about 10 μm to about 100 μm.

* * * * *